United States Patent Office 3,504,800
Patented Apr. 7, 1970

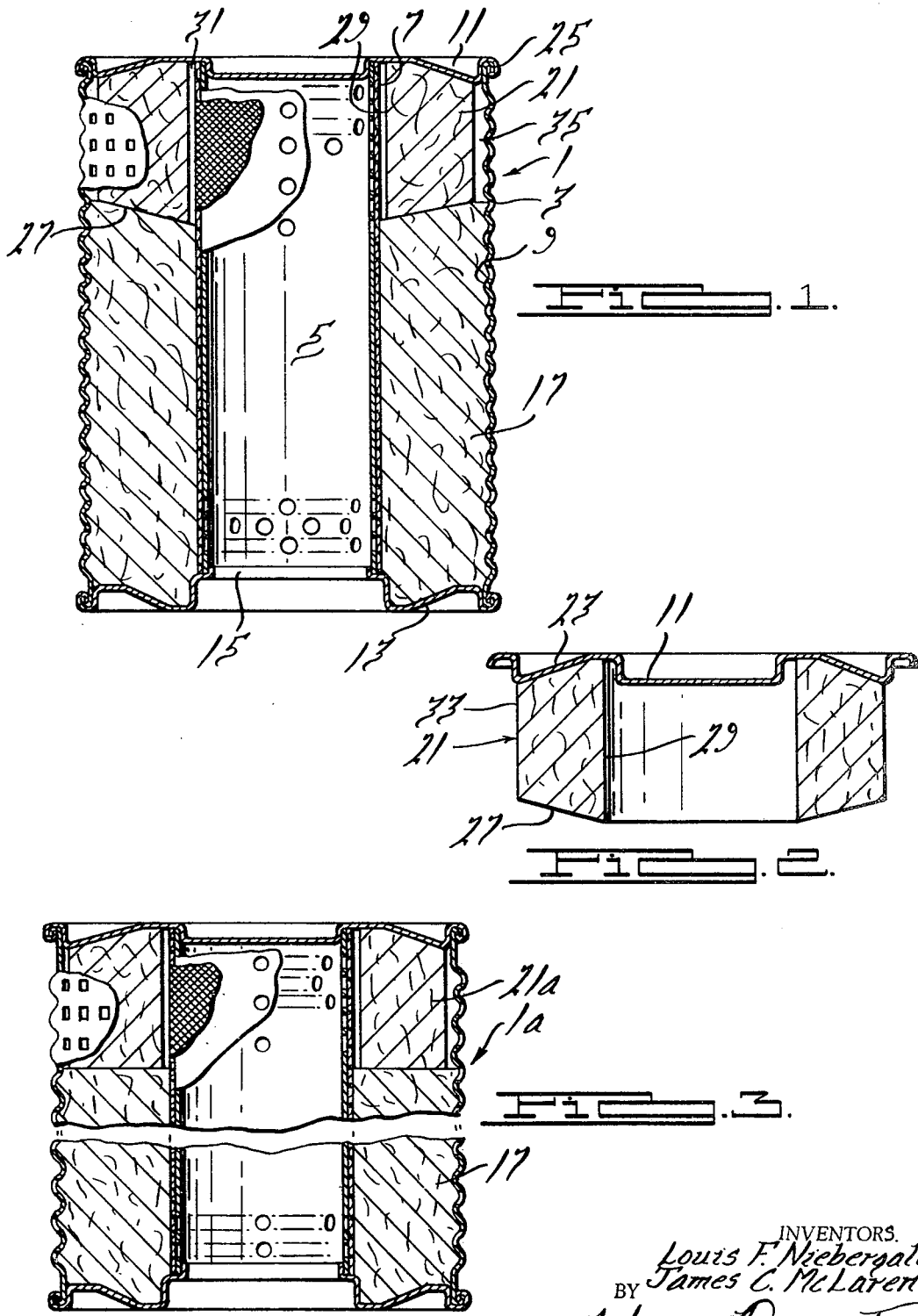

---

3,504,800
FILTER INCLUDING HIGH FLOW MOLDED ELEMENT
Louis F. Niebergall and James C. McLaren, Racine, Wis., assignors, by mesne assignments, to Tenneco Inc., Houston, Tex., a corporation of Delaware
Continuation of application Ser. No. 185,661, Apr. 6, 1962, and a continuation of applications Ser. No. 451,761, and Ser. No. 451,762, both Apr. 29, 1965, which are divisions of said Ser. No. 185,661. This application Jan. 11, 1967, Ser. No. 613,385
Int. Cl. B01d 25/02, 25/06, 27/00
U.S. Cl. 210—317                8 Claims

ABSTRACT OF THE DISCLOSURE

A high flow molded element formed of uniform diameter resin coated viscose rayon fibers is used in a parallel dual media-dual flow filter to remove particles above a predetermined size. The element is made to a predetermined size, density, porosity, and flow resistance and being essentially rigid it resists unloading. It may be conically shaped to have a substantially uniform rate of flow or internally flocked to provide more uniform porosity. An end cap may be adhered to the element as a subassembly and the inlet and outlet faces are preferably spaced from adjacent portions of the housing to insure flow to the entire areas of these faces.

CROSS REFERENCES TO RELATED APPLICATIONS

This application is a continuation of copending Ser. No. 185,661 filed Apr. 6, 1962 now abandoned. It is also a continuation of copending Ser. Nos. 451,761 and 451,762, both filed Apr. 29, 1965, and now both abandoned which are divisions of Ser. No. 185,661.

BRIEF SUMMARY OF THE INVENTION

The invention centers around a high flow, high porosity, low resistance molded fibrous depth-type filter element preferably formed of uniform diameter, resin coated, viscose rayon fibers which is essentially rigid and resistant to breathing and unloading and therefore has a high efficiency and contaminant retention capacity. Preferably the element is shaped and disposed in the filter so that its effective inlet and outlet areas are substantially the same to obtain a more uniform flow rate through the element than heretofore. The fibers are arranged with a high degree of random orientation and are preferably crimped to minimize the possibility of parallelism. The fiber diameter is preferably less than that of the maximum diameter particle to be removed by the element. An internal flocking technique may be used, if desired, to promote uniform porosity.

The filter element has particular advantages when used as the high flow element in a parallel dual flow automotive type oil filter such as disclosed in U.S. Patent 2,559,267. In such application it may contact a packed depth type low flow filter media such as waste cotton and it is formed and molded to a predetermined size, shape, density, and porosity that improves the performance of the total filter.

DESCRIPTION OF DRAWINGS

FIGURE 1 is a cross section through a form of filter cartridge adapted for use in various filters now on the open market.

FIGURE 2 is a detailed section of the open or low resistance filter medium showing it rigidly secured to one end cap of the filter cartridge; and FIGURE 3 is a view similar to FIGURE 1 but shows a different shape for the low resistance filter medium.

DESCRIPTION OF PREFERRED EMBODIMENTS

The filter cartirgde 1 that is shown in FIGURE 1, comprises an outer shell 3 which is perforated so that it is readily pervious to the flow of liquid. Inside of it is a perforated inner tube 5 surrounded by a fabric sleeve 7 that forms a barrier against migration of filter material through the tube 5. The space 9 between the shell 3 and tube 5 comprises a chamber for the filter media and the opposite ends thereof are closed by a top end cap 11 and a bottom end cap 13. The top end cap 11 is preferably arranged so that it closes off the top end of the tube 5 whereas the bottom end cap 13 has an opening 15 in alignment with the bottom of the tube 5. The cartridge 1 is thus of the outside-in type in which oil will flow radially inwardly through the side wall provided by the outer housing 3, through the filter media in chamber 9, and out through the perforated tube 5 down through the opening 15 to the engine bearings, etc. Two filter media 17 and 21 are in chamber 9 and their positions may be reversed from that shown in the drawings if desired.

The filter medium 17 comprises a high resistance and low permeability material such as waste cotton and various other materials well known in the trade. This is packed in tightly between the shell 3 and the tube 5 and is effective to remove relatively fine particles and contaminants from the oil passing through the filter cartridge.

The present invention is directed principally at the filter medium 21. This is a low resistance material (as compared with section 17) which will permit filtration even when the oil is relatively viscous. This medium is preferably composed of viscose rayon fibers, which are preferably crimped, and in which random orientation in the disposition of the fibers is attained as much as possible. The section 21 for one important automotive application is designed to retain a high percentage of particles having a size of 80 microns or larger. For this application we use a body in which all the fibers are uniform in diameter and somewhat smaller in diameter than the particles to be excluded, i.e., fibers about 60 to 70 microns in diameter are suitable. The fibers are preferably 1 to 4 inches in length and packed as uniformly as possible throughout the body to a density of about 0.200 gram per cubic centimeter. When crimped fibers are used, the amplitude and length of the crimps in the molded element should preferably be less than the 80 micron maximum size.

The viscose rayon fibers are preferably coated with a suitable coating and bonding agent to help to make the fibers rigid and resistant to the deleterious effects of heat, water, oil and products of combustion normally found in engine crankcases. Additionally, such coating will enable the mass of fibers to be molded rigidly into the shape illustrated. A solution of phenolformaldehyde resin in alcohol can be used as such an agent to coat the fibers thus serves as a protective coating and also as a bonding agent. The fibers after coating can then be compressed in a hot metal mold in order to achieve a partial cure of the resin and to obtain a molded element having fixed dimensions and forming an essentially rigid but open structure. The final complete cure can then be obtained either with or without fixtures by suitable methods.

One advantage of forming the filter medium 21 as a rigid molded element is that it is more capable of holding particles after entrapment because it can resist the breathing action that is due to fluctuation in pressure across the filter media which in other types of filter medium sometimes causes "unloading." The density of compression is controlled, of course, to obtain the proper pressure differential while at the same time excluding particles larger than 80 microns. As an example, 27 grams of either 40 or 50 denier viscose rayon fibers molded into the form of the filter media 21a shown in FIGURE 3 gave the desired results when the element 21a was substantially of 3¼" O.D. and 1¹¹⁄₁₆" I.D. and had a 1" minimum height on the outside and a 1¼" height on the inside diameter.

While viscose rayon fibers have proved to be a satisfactory material, other equivalent materials may be used provided they are available in unform diameter fibers and have the desired coating, packing, and filtering characteristics and resistance to chemical attack.

In addition to the composition and treatment given the materials forming the filter medium 21, the shape of the molded element is also important. It will be noted that the top end of the filter media 21 (as well as 21a) is inclined or tapered, so as to increase the length of the filter element 21 at the inner diameter. This top face 23 is rigidly secured by suitable adhesive or other means to the bottom face of the top end cap 11 so that the two will form a subassembly as shown in FIG. 2, that can be simply dropped into the top of the shell 3 after which the end cap 11 can be crimped at 25 to the top end of the shell 3. The bottom face 27 of the element 21 is also tapered so as to increase the length of the element along the inner diameter whereas the bottom surface of element 21a is at right angles to the axis.

The inner diameter of elements 21 and 21a is larger than the outer diameter of the tube 5 plus the migration barrier 7 so as to provide a flow equalizing chamber 31 around the outside of the migration barrier 7. Similarly, the outer diameter 33 of the element 21 is somewhat smaller than the inner diameter of the shell 3 so as to provide a small chamber 35 surrounding the outside of the filter element 21. The two chambers 31 and 35 accommodate dimensional variations so that the subassembly shown in FIG. 2 can be readily dropped into place in the top of the housing 3 at assembly. Additionally, the chambers 31 and 35 provide for free flow of the oil about both the inner and outer peripheries of the element 21 thus utilizing the full areas of both inner and outer peripheries.

The height of the element 21 along its outer diameter 33 as compared with its height along the inner diameter 29 is preferably in such ratio that the area on the outer periphery is about the same as the area of the element on its inner pheriphery. Thus, oil will flow through the filter element 21 at a substantially constant velocity, resulting in an increase in efficiency as compared with high flow sections currently used. By making the length of the surface 29 still larger, the outlet velocity can be less than the inlet velocity if that is desired for maximum efficiency. The element 21a of FIG. 3 provides a moderate tendency to equalize inlet and outlet velocities since the bottom surface 27a is at right angles to the axis. The clearances 31 and 35, of course, permit the full areas of the inner and outer peripheries of the elements 21 and 21a to be effective.

It will be noted that in radial cross sections through the face 27 the oil will flow through the filter section 17 as well as through the section 21. Thus, along the length of the face 27 there will be in effect a multistage or gradient flow since the resistance will vary along the length of the face 27. By making the face 27 on a sharper taper, the length of this effect which has a tendency to increase the full flow life of the filter, can be increased. This particular feature is, of course, not found in the design on FIG. 3.

As an additional feature to improve the filtering efficiency of section 21, an internal flocking operation may be used, preferably after the section has been molded. In accordance with one way of providing this feature, a pressure differential is established between the outside and inside surfaces 33 and 29 of the element (as by putting the inside under vacuum and a cone around the outside) and a jet of air is caused to flow laminarly in a radial direction through the element. This air jet is charged with a proper quantity of about 10–20 micron diameter fibers about ¹⁄₁₆" long ("spears") preferably also of viscose rayon. The spears will line up parallel to the path of air flow and will got to the weak spots, or points of highest flow, in the element and deposit there to reduce the oversize. They will wedge themselves in place among the larger fibers or they can be coated with a resin, in the manner described for the larger fibers, so that they will stick and can be molded in place. Such internal flocking can therefore be used to produce uniformity of porosity and resistance through the element and the spears themselves will act as a filter medium. This procedure can also be used to produce a controlled porosity element by deliberately starting with one that is over-porous and uniformly reducing the porosity to the desired degree. The spears can be selected and treated so as to absorb, adsorb, and/or strain out impurities.

Modifications can be made without departing from the spirit and substance of the invention.

We claim:

1. A two stage outside-in flow oil filter for use in lubricating systems of internal combustion engines to remove fine particles and contaminants above a predetermined 80 micron particle size from oil flowing through the filter comprising the combination of an annular housing having perforate concentric tubular inner and outer walls for radial outside-in oil flow and end caps closing the opposite ends of the space between the walls and connected to the outer wall, a pervious flexible migration barrier around the outside of the inner wall and engaging its outer surface, a low flow rate loose fibrous cotton filter material packed tightly between the walls of said housing and filling the space between said outer wall and migration barrier and extending along a major part of the length of the housing and capable of removing fine particles from the oil, and a high flow rate annular molded fibrous body of preselected size and shape in said housing and occupying the remainder of the length of the housing and pressing at one end against said low flow rate filter material, the other end of said body being adhered to an end cap prior to connection of the end cap to the outer wall, said material and body being arranged for parallel oil flow through the housing, said high flow rate body having an inner surface forming the outlet for oil flowing through the body and said inner surface being spaced radially from said migration barrier, said body having an outer surface forming the inlet for oil flowing through the body and said outer surface being smaller than the inner diameter of the housing to provide a clearance space between the body and housing, said high flow rate body being formed solely from a preselected weight of preselected uniform diameter rayon fibers, said rayon fibers being crimped and in random orientation and resin coated and the resin being in a cured state to rigidify and protective coat the rayon fibers and bond them to each other and hold the fibers together in a porous but essentially rigid structure of fixed dimensions capable of resisting breathing and unloading due to fluctuation in pressure across the body, said high flow rate body having a higher porosity than said low flow rate material and its porosity, density, size, and shape being preselected and pre-established prior to insertion of the body into the housing and its porosity, and density being substantially uniform throughout the thickness of the body, said body having a porosity such that it is capable of filtering from the oil and retaining a high percentage of particles above said predetermined particle size and said rayon fibers having a uniform diameter less than said predetermined particle size.

2. A two stage outside-inflow oil filter for use in lubricating systems of internal combustion engines to remove contaminants above a predetermined 80 micron particle size from oil flowing through the filter comprising the combination of an annular housing having perforate concentric tubular inner and outer walls for radial outside-in oil flow and end caps closing the opposite ends of the space between the walls and connected to the outer wall, a low flow rate loose natural fine fibrous absorbent filter material packed tightly between the walls of said housing and filling the space between said inner and outer walls and extending along a major part of the length of the housing and capable of removing fine particles from the oil, and a high flow rate annular molded fibrous body of preselected size and shape in said housing and occupying the remainder of the length of the housing and pressing at one end against said low flow rate filter material, said material and body being arranged for parallel flow of oil through the housing, said high flow rate body being formed solely from a preselected weight of preselected uniform diameter rayon fibers, said rayon fibers being crimped and in random orientation and resin coated and the resin being in a cured state to rigidify and protective coat the rayon fibers and bond them to each other and hold the fibers together in a porous but essentially rigid structure of fixed dimensions capable of resisting breathing and unloading due to fluctuation in pressure across the body, said high flow rate body having a higher porosity than said low flow rate material and its porosity, density, size, and shape being preselected and pre-established prior to insertion of the body into the housing and its porosity, and density being substantially uniform throughout the thickness of the body, said body having a porosity such that it is capable of filtering from the oil and retaining a high percentage of particles above said predetermined particle size and said rayon fibers having a uniform diameter less than said predetermined particle size.

3. In a two flow rate oil filter for fine and coarse filtering and for removing contaminants above 80 micron particle size from oil flowing through the filter and adapted for use in lubricating systems of internal combustion engines, the combination of a housing defining a filter media chamber and provided with openings for oil flow through the chamber, first and second different filter media in said chamber in the path of oil flowing through the chamber and occupying respectively different parts of the chamber, the first of said media being a low flow rate and relatively dense filter material of fine absorbent natural fibers for removing fine particles from oil flowing through it, the second of said media being a high flow rate and relatively coarse filter element for removing particles above said predetermined particle size from oil flowing through it, the first of said media being substantially longer in length than the second, said high flow rate element being a fibrous ring disposed in said chamber with respect to said openings for radial outside-inflow and of preselected size and shape formed from a preselected weight of preselected uniform diameter synthetic fibers, said fibers being uniformly distributed and in random orientation and resin coated and the resin being in a cured state to rigidify and protective coat the fibers and bond them to each other and hold the fibers together in a porous but essentially rigid annular structure capable of resisting breathing and unloading due to fluctuation in pressure across the body, said high flow rate element having a substantially higher porosity than said low flow rate material and its porosity, density, size, and shape being preselected and pre-established prior to insertion of the element into the filter chamber and its porosity, and density being substantially uniform across the thickness of the element, said high flow element having a porosity such that it is capable of excluding from filtered oil particles above said particle size and said synthetic fibers having a uniform diameter less than said particle size.

4. A dual flow filter for removing contaminants from fluid flowing through the filter comprising a housing having an inlet means and an outlet means for fluid flow through the filter, first and second separate filter media in said housing arranged in parallel between said inlet and outlet means so that fluid flows through one or the other of the media, the first of said media having a relatively low porosity and flow rate and high flow resistance and being capable of removing relatively fine contaminants from fluid flowing through it, the second of said media having a relatively high and predetermined porosity and high flow rate and a relatively low and predetermined flow resistance and being capable of removing relatively large particle size contaminants above a predetermined size from fluid flowing through it, the second of said media being of the depth type and having a substantial media being of the depth type and having a substandard thickness in the direction of fluid flow and comprising a fixed dimension fiber body of predetermined size, weight, and shape, said body comprising uniformly packed randomly oriented resin coated synthetic fibers of predetermined uniform diameter, said resin protecting said fibers and being in a cured state and bonding said fibers one to the other and holding said fibers together in a porous but essentially rigid structure of predetermined density capable of resisting breathing and unloading due to fluctuation in pressure across the body, the diameter of said fibers being less than that of said predetermined size large particle contaminants.

5. A filter element for filtering out of a fluid particles larger than a predetermined size and consisting solely of a body of uniform diameter rayon fibers each of which has a resin coating, said resin being in a cured state and bonding said rayon fibers one to the other and holding said rayon fibers together in a porous but essentially rigid structure having a predetermined density and porosity and capable of filtering out of fluid flowing through it said particles larger than said predetermined size, said resin holding said rayon fibers together so that said filter body resists breathing and unloading due to fluctation in pressure across the filter body, said filter body being annular and at least one end of the body being substantially conical so that the length of the inner annular surface is greater than that of the outer annular surface by an amount such that the area of the inner annular surface is substantially the same as the area of the outer annular surface, said outer annular surface being the fluid inlet side and the inner annular surface being the fluid outlet side for fluid flowing through the body.

6. In a dual flow filter automotive type oil filter for removing fine contaminants and particles larger than 80 microns from oil flowing through the filter, the combination of a housing having an inlet means and an outlet means for oil flow through the filter, first and second separate filter media in said housing arranged in parallel between said inlet and outlet means so that fluid flows through one or the other of the media, the first of said media having a relatively low porosity and flow rate and high flow resistance and being capable of removing said fine contaminants from oil flowing through it, the second of said media having a relatively high and predetermined porosity and high flow rate and a relatively low and predetermined flow resistance and being capable of removing substantially all contaminants above said 80 micron particle size from oil flowing through it, the second of said media being of the depth type and having a substantial thickness in the direction of oil flow and comprising a fixed dimension fiber body of predetermined size, weight, and shape, substantially all fibers in said body being water resistant and synthetic and being substantially uniformly packed and randomly oriented throughout the body, said fibers being bonded one to the other and held together in a porous but essentially rigid structure of predetermined density capable of resisting breathing and unloading due to fluctuation in pressure across the body, the diameter of said fibers being uniform and less than 80 microns.

7. A parallel flow filter for removing fine contaminants and particles larger than 80 microns from fluid flowing through the filter comprising the combination of a housing having an inlet means and an outlet means for fluid flow through the filter, first and second separate filter media in said housing arranged in parallel between said inlet and outlet means so that fluid flows through one or the other of the media, the first of said media comprising a mass of tightly packed absorbent fibrous material forming a depth filter media of a relatively low porosity and flow rate and high flow resistance and capable of removing relatively fine contaminants from fluid flowing through it, the second of said media having a relatively high and predetermined porosity and high flow rate and a relatively low and predetermined flow resistance and being capable of removing substantially all particles larger than 80 microns from fluid flowing through it, the second of said media being of the depth type and having a substantial thickness in the direction of fluid flow and comprising a fixed dimension fiber body of predetermined size, weight, and shape, said body comprising substantially uniformly packed randomly oriented water resistant synthetic fibers of predetermined uniform diameter, said fibers being bonded one to the other and held together in a porous but essentially rigid structure of predetermined density capable of resisting breathing and unloading due to fluctuation in pressure across the body, said fixed dimension high flow rate body and said tightly packed low flow rate body pressing against each other in said housing.

8. A dual flow filter for removing contaminants from fluid flowing through the filter comprising a housing having an inlet means and an outlet means for fluid flow through the filter, first and second separate filter media in said housing arranged in parallel between said inlet and outlet means so that fluid flows through one or the other of the media, the first of said media having a relatively low porosity and flow rate and high flow resistance and being capable of removing relatively fine contaminants from fluid flowing through it, the second of said media having a relatively high and predetermined porosity and high flow rate and a relatively low and predetermined flow resistance and being capable of removing relatively large particle size contaminants above a predetermined size from fluid flowing through it, the second of said media being of the depth type and having a substantial thickness in the direction of fluid flow and comprising a fixed dimension fiber body of predetermined size, weight, and shape, said body comprising uniformly packed randomly oriented resin coated synthetic fibers of predetermined uniform diameter, said resin protecting said fibers and being in a cured state and bonding said fibers one to the other and holding said fibers together in a porous but essentially rigid structure of predetermined density capable of resisting breathing and unloading due to fluctuation in pressure across the body, the diameter of said fibers being less than that of said predetermined size large particle contaminants, the second of said media having inner and outer surfaces and being substantially conical on at least one end so that the areas of its inner and outer surfaces are substantially the same to provide for a substantially uniform flow velocity through said second media body.

References Cited

UNITED STATES PATENTS

| | | | |
|---|---|---|---|
| 2,539,768 | 1/1951 | Anderson | 210—496 |
| 2,559,267 | 7/1951 | Winslow et al. | 210—323 X |
| 2,670,851 | 3/1954 | Curtis | 210—488 X |
| 2,800,232 | 7/1957 | Marvel | 210—488 X |
| 2,813,051 | 11/1957 | MacHenry | 210—496 X |
| 2,963,744 | 12/1960 | Cooper | 264—137 X |
| 2,969,104 | 1/1961 | Schubert et al. | 264—121 X |
| 3,073,735 | 1/1963 | Till et al. | 210—496 X |
| 3,095,370 | 6/1963 | Krogman | 210—133 |
| 2,888,095 | 5/1959 | Perrini et al. | 55—487 |
| 3,127,255 | 3/1964 | Winslow | 210—317 X |

FOREIGN PATENTS 870,975  2/1961  Great Britain.

SAMIH N. ZAHARNA, Primary Examiner

U.S. Cl. X.R.

210—457, 484, 488, 496; 264—121

UNITED STATES PATENT OFFICE
CERTIFICATE OF CORRECTION

Patent No. 3,504,800　　　　　　　　　Dated　April 7, 1970

Inventor(s) Louis F. Niebergall and James C. McLaren

It is certified that error appears in the above-identified patent and that said Letters Patent are hereby corrected as shown below:

Column 2, line 5, "cartrigde" should read --cartridge--. Column 4, line 8, "got" should read --go--. Column 5, line 29, before "density" insert --weight,--. Column 6, delete line 17.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents